Patented Nov. 18, 1924.

1,515,803

UNITED STATES PATENT OFFICE.

HARRY C. YOUNG, OF ST. LOUIS, MISSOURI.

FUNGICIDE AND INSECTICIDE.

No Drawing. Application filed April 4, 1923. Serial No. 629,872.

*To all whom it may concern:*

Be it known that I, HARRY C. YOUNG, a citizen of the United States, and a resident of St. Louis, in the State of Missouri, have invented new and useful Improvements in Fungicides and Insecticides, of which the following is a specification.

This invention relates to fungicides and insecticides and more particularly to such agents which contain sulphur mixtures for accomplishing their functions, and to processes of producing them.

Since the introduction of spraying for the control of parasitic fungi there has been developed a large number of fungicidal mixtures. Due to its abundance, low cost, and effectiveness under limiting conditions, sulphur has been employed in many of these mixtures. Such mixtures have usually comprised flowers of sulphur, lime sulphur, and so forth. But these sulphur mixtures have proved unsatisfactory for many reasons, among which may be noted: that they often burn the trees or plants on which they are used, that they frequently require special conditions for their use, that they cannot be used generally against most known fungi, and that they are not retained effectively on the sprayed tree or plant.

One of the objects of this invention is accordingly to produce a fungicide and insecticide which will exert a lasting effectiveness on the tree or plant.

A further object of this invention is to produce a fungicide and insecticide whose sulphur content in characterized by its readiness of oxidation.

A still further object of this invention is to produce a fungicide and insecticide whose activity is not influenced effectively by climatic factors.

Other and further objects and advantages of this invention will appear from the more detailed description set forth below, it being understood that various changes may be made therein by those skilled in the art without departing from the spirit or scope of this invention.

As the result of extended research, certain fundamental factors have been determined, a knowledge of which has enabled a better scientific development and control of fungicidal and insecticidal compositions. Some of the factors thus determined may be summarized as follows: The toxicity of sulphur mixtures is not due to (1) hydroxyl ions (present for example in lime sulphur mixtures); (2) calcium thiosulphate or other thiosulphates; (3) sulphites and sulphates; (4) hydrogen sulphide, sulphur dioxide, and sulphur trioxide. The lasting fungicidal value of sulphur mixtures is due almost entirely to precipitated sulphur, directly or indirectly leading to the formation of polythionates, the toxic properties of these mixtures being related to the presence or formation of polythionates, particularly the pentathionate formed from the precipitated sulphur. When the sulphur of the sulphur mixture is present in the hydrophobic condition, the presence of water and of oxygen are particularly desirable. As a result of these determinations, in our work, sulphur mixtures are preferably used for the reasons stated above. Among the various factors that it has been found are profitably limited, the following are noted: the effective fungicidal and germicidal agent, for example, sulphur, should be present under conditions which enable ready oxidation to produce the desired products. In the case of sulphur, these conditions will include the presence of sulphur in a preferably finely divided condition with moisture or water so that oxidation readily takes place with the formation of such compounds as pentathionic acid. The hydrogen ion concentration of these mixtures is preferably also carefully controlled since the best results are obtained under limited conditions of hydrogen ion concentrations. Further, since pentathionic acid and related compounds are quite volatile, it is often desirable to incorporate with the mixture a colloidal or adsorptive substance, which serves to retain the active fungicidal and insecticidal agents in contact with the tree or plant.

With these desirable fundamental observations in mind, a number of examples will be given. These examples it will be found will generally group themselves into two closely related groups, depending for the most part on the condition of the sulphur present in them. But it will be understood that these sulphur mixtures are not necessarily mutually exclusive, inasmuch as the sulphur may be present in several forms in the same mixture.

1. Lime sulphur mixtures prepared commercially, or as made by boiling together calcium oxide and sulphur in the proportions of one part of calcium oxide to one to three parts of sulphur or one part of sulphur to one to three parts of calcium oxide, are precipitated by an acid, for example, phosphoric acid. The acid is added to the mixture until no more precipitate is formed and preferably until the hydrogen ion concentration is between $P_H=3.2$ to 6.4. Other acids may be used in producing this precipitate, for example sulphuric acid, hydrochloric acid, and other, preferably mineral acids.

2. Sulphides of metals, such as calcium, sodium, and potassium, are precipitated by acids, preferably mineral, until no further precipitate is formed and the reaction adjusted to a hydrogen ion concentration of preferably $P_H=3.2$ to 6.4.

3. Sulphur dioxide and hydrogen sulphide are passed into water preferably simultaneously, the hydrogen sulphide being maintained in excess.

4. To the precipitate or flocculate prepared by any of the methods given above may then be added an adsorptive or colloidal substance. For example, one pound of glue, previously dissolved in hot water, is added to five pounds of the sulphur precipitate. Other adsorptive and colloidal substances may be used in place of glue, for example, casein, diatomaceous earth, or any adsorptive colloid that preferably will not materially change the reaction of the mixture.

The mixtures thus prepared, contain the sulphur in hydrophobic form and may be used for the best effects, in concentrations as follows: from one pound of the precipitated sulphur and colloid mixture to five gallons of water, to one pound of precipitated sulphur and colloid to 25 gallons of water and will be found to be readily oxidized at even ordinary temperatures in the presence of oxygen, and form very effective mixtures for the control of fungous and insect pests on plants of all kinds. If desired, other insecticides may be added to these mixtures.

5. A saturated solution of sodium thiosulphate is made and add sulphuric acid added slowly to this concentrated until both the thiosulphate and acid are practically destroyed. The proportions of sodium thiosulphate and acid are about 50 parts of the former to 70 parts of the latter, by weight. The mixture is kept cool during the addition of the sulphuric acid to the sodium thiosulphate, is then warmed to 80° C. and then filtered while hot through a fine mesh screen, gauze or cloth. The hydrogen ion concentration is then adjusted to preferably $P_H=3.2$ to 5.8. In place of the reacting ingredients given above, any acid preferably mineral may be used, while other thiosulphate such as potassium, calcium, and ammonium are also usable in place of the sodium salt.

6. Sulphur dioxide and hydrogen sulphide are passed, preferably simultaneously, into water, keeing the sulphur dioxide in excess, for a period of one to twenty-four hours depending on the quantity of water present. The hydrogen ion concentration is preferably adjusted to $P_H=3.2$ to 5.8.

The mixtures of examples 5 and 6 may be used directly. On testing they are found to contain soluble sulphur, pentathionic acid, salts of polythionic acids, insoluble sulphur, and water, and as impurities, sulphates. The quantity of sulphur present has a valuable function in preventing a too rapid volatilization of the pentathionic acid. The quantity of the sulphur and water present in the mixtures is sufficient to generate pentathionic acid continuously. Due to its condition, it will be found that when sprayed on a tree for example, these mixtures adhere closely to the leaves and cannot be readily washed off, as by rain.

In general, it may be stated that the hydrogen ion concentration is a very important contributing factor in all of the described mixtures. For the best results, it is preferably maintained between the limits $P_H=4.2$ to 5.4.

Having thus set forth my invention, I claim:

1. A fungicide and insecticide containing a sulphur mixture and having an hydrogen ion concentration of $P_H=3.2$ to 6.4.

2. A fungicide and insecticide containing a sulphur mixture and having a hydrogen ion concentration of $P_H=3.2$ to 5.8.

3. A fungicide and insecticide containing a sulphur mixture and having a hydrogen ion concentration of $P_H=4.2$ to 5.4.

4. A fungicide and insecticide containing finely divided sulphur and having a hydrogen ion concentration of $P_H=3.2$ to 6.4.

5. A fungicide and insecticide containing soluble sulphur, pentathionic acid, salts of polythionic acids, insoluble sulphur, and water.

6. A fungicide and insecticide as set forth in claim 5 containing besides the ingredients set forth in that claim, sulphates.

7. A fungicide and insecticide as set forth in claim 5, and having a hydrogen ion concentration of $P_H=3.2$ to 5.8.

8. A composition as set forth in claim 5 and having a hydrogen ion concentration of $P_H=4.2$ to 5.4.

9. The process of producing a fungicide and insecticide mixture which comprises treating a thiosulphate with a mineral acid, keeping the mixture cool during the addition of the acid, warming to 80 degrees C., and filtering.

10. The process of producing a fungicidal mixture which comprises treating a thiosulphate with a mineral acid, keeping the mixture cool during the addition of the acid, warming to 80 degrees C., filtering, and then adjusting the hydrogen ion concentration to $P_H = 3.2$ to 5.8.

11. A fungicide comprising a precipitated or flocculated sulphur in suspension having a hydrogen ion concentration of $P_H = 3.2$ to 6.4.

12. A fungicide comprising a precipitated or flocculated sulphur in suspension, and an adsorptive substance, the hydrogen ion concentration having the value $P_H = 3.2$ to 6.4.

13. A fungicide as set forth in claim 12 wherein the adsorptive substance is glue.

14. A fungicide as set forth in claim 12 wherein the adsorptive substance is a colloid.

15. The process of producing a fungicide and insecticide which comprises precipitating sulphur from its compounds and then adjusting the hydrogen ion concentration of the mixture containing the precipitate to $P_H = 3.2$ to 6.4.

16. A process as set forth in claim 15, in which the sulphur precipitate has added thereto an adsorptive substance.

17. The process of producing a fungicide and insecticide which comprises precipitating sulphur in its hydrophilic form, and then adjusting the hydrogen ion concentration of the mixture containing the precipitate to $P_H = 3.2$ to 5.8.

18. A fungicide and insecticide containing soluble sulphur, insoluble sulphur, pentathionic acid, salts of polythionic acids, sulphates, and water and having its hydrogen ion concentration adjusted to $P_H = 3.2$ to 5.8.

HARRY C. YOUNG.

Certificate of Correction.

It is hereby certified that Letters Patent No. 1,515,803, granted November 18, 1924, upon the application of Harry C. Young, of St. Louis, Missouri, for an improvement in "Fungicides and Insecticides," were erroneously issued to the inventor, said "Young," as owner of said invention, whereas said Letters Patent should have been issued to *Walter C. O'Kane, of Durham, New Hampshire, and Paul Moore, of Washington, D. C., as trustees of Crop Protection Institute, an Association of Washington, D. C.;* page 1, line 36, for the word "in" read *is;* page 2, line 68, for the word "keeing" read *keeping;* and that the said Letters Patent should be read with these corrections therein that the same may conform to the record of the case in the Patent Office.

Signed and sealed this 3d day of March, A. D. 1925.

[SEAL.]

KARL FENNING,
*Acting Commissioner of Patents.*